United States Patent [19]

Cooke et al.

[11] Patent Number: 4,996,099
[45] Date of Patent: Feb. 26, 1991

[54] FIRE-RESISTANT FABRIC

[75] Inventors: William M. Cooke, Charlotte, N.C.; James E. Hendrix, Spartanburg; Thomas W. Tolbert, Fort Mill, both of S.C.

[73] Assignee: Springs Industries, Inc., Fort Mill, S.C.

[21] Appl. No.: 427,738

[22] Filed: Oct. 27, 1989

[51] Int. Cl.⁵ .................................................. B32B 7/00
[52] U.S. Cl. ...................... 428/245; 428/224; 428/253; 428/255; 428/257; 428/284; 428/373; 428/423.1; 428/920
[58] Field of Search ............... 428/224, 253, 257, 373, 428/920, 284, 255, 245, 423.1

[56] References Cited

U.S. PATENT DOCUMENTS

| | | | |
|---|---|---|---|
| 3,729,920 | 5/1973 | Sayers et al. | 57/144 |
| 3,861,992 | 1/1975 | DeNobriga et al. | 161/67 |
| 3,913,309 | 10/1975 | Chiarotto | 57/144 |
| 4,001,477 | 1/1977 | Economy et al. | 428/224 |
| 4,018,983 | 4/1977 | Pedlow | 174/135 |
| 4,216,261 | 8/1980 | Dias | 428/264 |
| 4,249,368 | 2/1981 | Fehrer | 57/5 |
| 4,279,652 | 7/1981 | Ciaperoni et al. | 5/16 |
| 4,327,545 | 5/1982 | Fehrer | 57/5 |
| 4,365,655 | 12/1982 | Feinberg | 139/426 R |
| 4,463,465 | 3/1984 | Parker | 5/459 |
| 4,573,500 | 3/1986 | Bouglas | 139/426 R |
| 4,663,204 | 5/1987 | Langham | 428/12 |
| 4,670,327 | 6/1987 | Weber | 428/257 |
| 4,756,945 | 7/1988 | Gibb | 428/124 |

Primary Examiner—James J. Bell
Attorney, Agent, or Firm—Bell, Seltzer, Park & Gibson

[57] ABSTRACT

A fire-resistant fabric suitable for use as a flame barrier comprising a flame durable textile fabric substrate formed of corespun yarns, the yarns comprising a core of flame resistant fiber and a sheath of modacrylic intumescent staple fibers. In normal use, the fabric is flexible and conformable and has good air porosity. When exposed to high temperature or a flame, however, the modacrylic intumescent sheath fiber reacts and swells to form a char which closes the pores or interstices of the fabric to thus prevent flame or hot gases from penetrating therethrough.

6 Claims, 1 Drawing Sheet

FIRE-RESISTANT FABRIC

This invention relates to a protective fabric suitable for use as a heat and flame barrier. More particularly, the fabric may be used as a decorative fire-resistant fabric or used to prevent the combustion of flammable materials by placing the fabric between the heat source and any flammable material.

Various types of protective fabrics have been developed for use in applications in which fabric covered articles (e.g., upholstered articles or office panels) must be capable of withstanding exposure to heat and/or flame without combustion. For example, in upholstered aircraft seating, a heat resistant protective barrier fabric is typically provided between the outer upholstery fabric and the underlying flammable foam cushion to retard or prevent combustion of the cushion in the event of fire. Note, for example, Parker et al U.S. Pat. No. 4,463,465 which discloses a barrier fabric which comprises an aramid fabric substrate and an outer aluminum foil layer. The use of an aluminum foil layer, however, has several drawbacks, namely the fabric has limited breathability and the cushioning aspect of the upholstered article are reduced.

Another technique for producing a fire-resistant fabric is to coat the fabric with a fire-resistant compound. Exemplary compounds include those based on an inorganic hydrated compound such as hydrated alumina, hydrated magnesia, magnesium oxychloride, hydrated zinc borate and hydrated calcium borate. Coatings of this type, however, leave spaces between the fibers of the fabric. These spaces or iaterstices potentially allow hot gases and/or flames to penetrate therethrough and ignite the underlying flammable material.

Intumescent compounds are also used to produce a fire-resistant fabric. For example, Dias U.S. Pat. No. 4,216,261 discloses a method of applying an intumescent coating comprising an ammonium phosphate catalyst, a carbonific and a blowing agent. Intumescent coatings, however, require an extra step in the manufacture of the fabric thus the application thereof is time-consuming and expensive.

SUMMARY OF THE INVENTION

The present invention provides a fire-resistant fabric which is resistant to high temperature fires, is lightweight and breathable and is highly conformable and flexible. The fabric includes a textile fabric substrate formed of corespun yarns, the yarns comprising a core of a flame resistant fibers and a sheath of modacrylic intumescent staple fibers which swell and form a char on exposure to flame. The use of such yarns eliminates the necessity of coating the fabric or of adding a flame barrier metal layer. The fabric may be used either as an exterior fabric or as an underlying barrier fabric in various applications where heat and flame protective properties are required.

BRIEF DESCRIPTION OF THE DRAWINGS

Some of the features and advantages of the invention having been stated, others will appear as the description proceeds, when considered in conjunction with the accompanying drawings, in which.

DETAILED DESCRIPTION OF THE INVENTION

The present invention will be described more fully hereinafter with reference to the accompanying drawings, in which preferred embodiments of the invention are shown. This invention can, however, be embodied in many different forms and should not be construed as limited to the embodiment set forth herein; rather, applicants provide these embodiments so that this disclosure will be thorough and complete, and will fully convey the scope of the invention to those skilled in the art.

Figure 1:
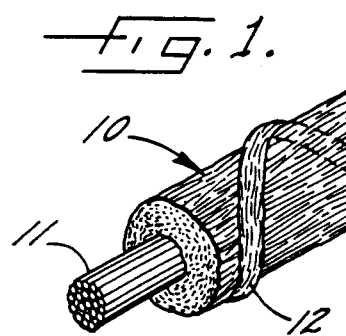
FIG. 1 is a greatly enlarged view of a fragment of the corespun yarn of the present invention with a portion of the sheath being removed at one end thereof.

Referring to FIG. 1, the fabrics of the present invention are formed from corespun yarns 10 comprising a core 11 of fire-resistant fibers and a sheath 12 of modacrylic intumescent fibers. Exemplary fire-resistant core fibers may include fibers of glass, polybenzimidazoles, polyimides, various metals, quartz, ceramics, polyetherketones, polyetheretherketones, polyetherketoneketones, polyetheretherketoneketones, polyetherimides, polysulfones, polyarylates, polyaryletherketones, polyamide-imides, polyarylsulfones, polyethersulfones, polyketones, polyphenylene sulfides, polyaramids such as Kevlar® or Nomex®, and carbon and carbonizable compounds and blends thereof. Additionally, the core fibers may be formed from corespun yarns and may include fire-resistant staple fibers as the sheath. These core fibers typically have a diameter of from about 5 to 6 μm. The modacrylic intumescent staple fibers have a diameter of about 1.3 denier and are characterized by being a long chain synthetic polymer containing 35-85% acrylonitrile units. An exemplary modacrylic intumescent fiber is SEF® fiber manufactured by Monsanto Corporation of St. Louis, Missouri. Additionally, the modacrylic fibers may be blended or commingled with small amounts of fibers which form a char on exposure to flame such as wool, silk and cellulosics while maintaining the intumescent properties of the modacrylic fibers.

The yarns of these fabrics are of corespun construction and are formed by suitable apparatus such as ring spinning, DREF® spinning or preferably using a Murata air jet spinning apparatus. Air jet spun yarn, the production of which is described for example in copending, commonly assigned U.S. Ser. No. 318,239, filed on Mar. 3, 1989, is characterized by having the majority of its fibers extending parallel to the yarn axis, with the ends of some of the modacrylic fibers intermittently extending out of the fiber bundle and wrapped or twisted around the other fibers to bind the whole together. Ring spun yarn is generally characterized by having its fibers arranged substantially uniformly in a helical arrangement, and the fibers are held in this arrangement by the twist of the yarn. If DREF® spinning is utilized, such as described in Fehrer U.S. Pat. Nos. 4,249,368 and 4,327,545, the core may be of multi-fiber construction with minor amounts of fibers which improve the mechanical characteristics of the yarn such as nylon, PET, cotton and cellulosics while not adversely affecting the flame durability of the majority of fire-resistant fibers described above.

Figure 2:
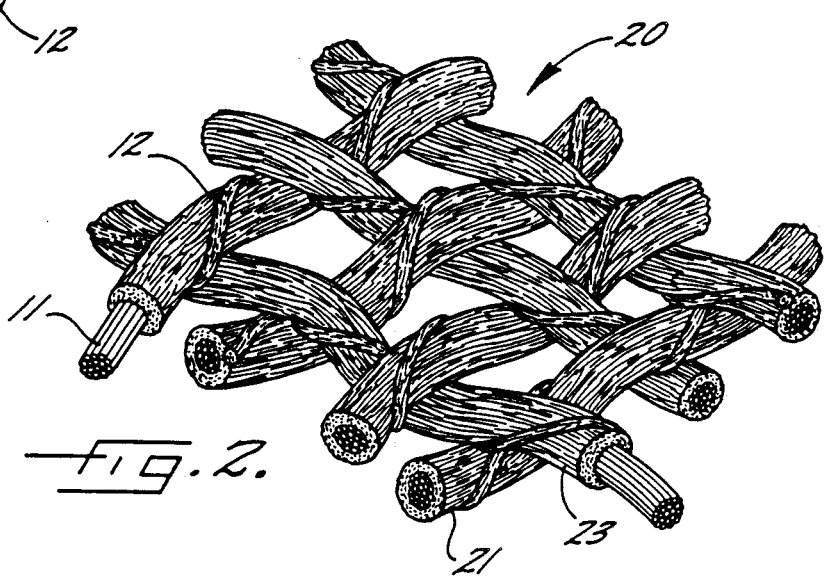
FIG. 2 is an enlarged isometric view of a portion of a woven fire-resistant fabric.

The corespun yarns may be formed into a textile fabric substrate using any of the various fabric constructions, such as fabrics of woven, non-woven, knitted including warp and circular knits, braided, warp lay and scrim reinforced web construction. Referring to FIG. 2, a particular textile fabric substrate having a woven construction is illustrated. The woven textile fabric substrate 20 is formed by warp yarns 21 interengaged with weft yarns 23 at spaced intervals and is woven by conventional techniques. Such a woven fabric typically comprises 20/1 to 10/1 cotton count yarns for pillow and mattress ticking and 1/1 to 10/1 cotton count yarns for decorative upholstery.

In general, the fire-resistant fabric is useful both as a flame barrier and as a decorative fabric. In everyday use, the fabrics of the present invention are lightweight and flexible because of the absence of a metal foil layer or a coating layer, and thus can easily be conformed to the shape of the article. Additionally, the fabrics are breathable because of their porosity. The porosity and breathability of a fabric is expressed in terms of the "air permeability" of the fabric. Air permeability is measured in accordance with ASTM Standard Test Method D737 for Air Permeability of Textile Fabrics. The rate of flow through a known area of fabric is adjusted to secure a prescribed pressure differential between the two surface of the fabric in the test area and from this rate of flow the air permeability of fabric is determined. Thus, using a 4 mm calibration orifice to which air is blown at a rate of about 3.6 cubic feet per minute, the woven fabric of the present invention has an air permeability of about 10 to 300 cubic feet per minute.

In particular, the air permeability of the barrier fabric assures good air circulation for comfort. The air permeability of the barrier fabric is also particularly important when the barrier is used with cushioned upholstered articles used for seating. Because of the air permeability of the flame barrier fabric, air is free to escape from the cushion when it is compressed. Thus, the fabric avoids the hard and uncomfortable "balloon" effect that is characteristic of most prior art air impermeable flame barrier fabrics.

However, on exposure to flame, the modacrylic intumescent fibers of the fabric swell and char. As a result of the swelling, the pores or interstices between the yarns are closed. The char is substantially incombustible and has cellular characteristics. The char thus acts as a flame barrier and limits the penetration of flames and hot gases through the fabric to ignite the underlying flammable material. The core fibers of the corespun yarns also contribute to the flame resistant properties of the fabric in that they remain intact on exposure to a flame and provide a lattice or support for the modacrylic intumescent sheath fibers. Additionally, if a corespun fiber is used, the core itself may provide flame barrier properties.

Figure 3:
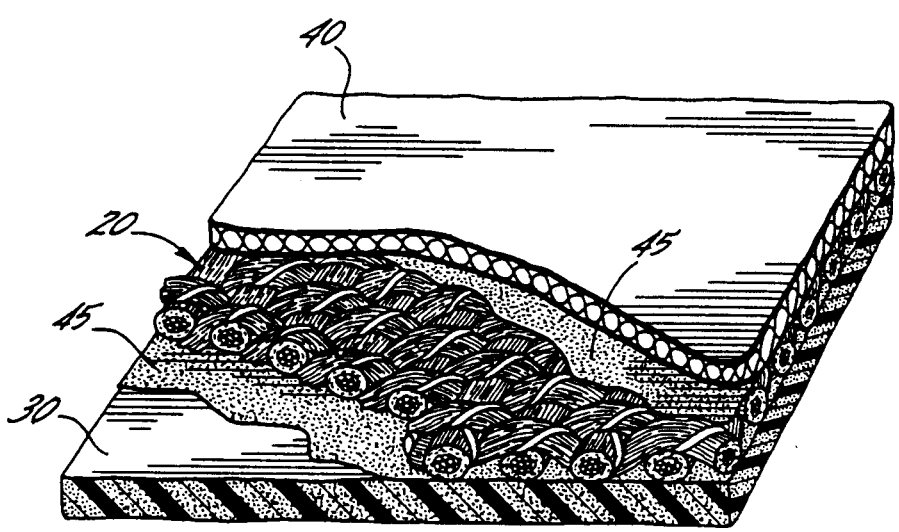
FIG. 3 is an enlarged isometric view of a portion of a flame resistant fabric laminate which includes a woven fire-resistant fabric as shown in FIG. 2, with the layers broken away to more clearly reveal the laminate construction.

Barrier fabrics of the present invention are particularly suitable as flame barriers for upholstered articles since the flame barrier fabric can easily be conformed to the shape of the article. For example, as shown in FIG. 3, it is particularly effective as a barrier in an upholstered article wherein the fabric 20 is placed between an underlying flammable layer 30 such as polyurethane foam and an upholstery layer 40 preferably using an adhesive layer 45 such as a latex anti-slide adhesive. Additionally, the fabrics may be used as flame resistant textile articles such as mattress and pillow ticking, mattress and pillow covers, draperies, zipper tape, tents, awnings, field fire shelters, sleeping bag covers, marine covers, tarpaulins, protective apparel and the like.

In the drawings and specification, there have been disclosed preferred embodiments in the invention, although specific terms are employed, they are used in a generic and descriptive sense only and not for the purpose of limitation, the scope of the invention being set forth in the following claims.

That which is claimed is:

1. A fire-resistant laminate comprising an underlying flammable layer and a flame barrier fabric overlying said underlying flammable layer, said flame barrier fabric comprising a flame durable textile fabric substrate formed of corespun yarns, said yarns comprising a core of a flame resistant fiber and a sheath of modacrylic intumescent staple fibers which swell and form a char on exposure to flame.

2. A fire-resistant laminate according to claim 1 wherein the textile fabric substrate is of woven, nonwoven, knitted, braided, warp lay and scrim reinforced web construction.

3. A fire-resistant fabric according to claim 1 wherein the flame resistant fiber of the core is selected from the group consisting of glass, polybenzimidazole, polyimides, various metals, quartz, ceramics, polyetherketones, polyetheretherketones, polyetherketoneketones, polyetheretherketoneketones, polyetherimides, polysulfones, polyarylates, polyaryletherketones, polyamideimides, polyarylsulfones, polyethersulfones, polyketones, polyphenylene sulfides, polyaramids and carbon and carbonizable compounds and blends thereof.

4. A fire-resistant fabric according to claim 3 wherein the flame resistant fiber of the core is a corespun fiber.

5. A fire-resistant fabric according to claim 1 wherein the modacrylic intumescent staple fibers are blended with a fiber selected from the group consisting of wool, silk and cellulosic fibers.

6. A fire-resistant laminate according to claim 1 wherein the underlying flammable layer comprises a polyurethane foam.

* * * * *